United States Patent [19]

Sato et al.

[11] 3,999,011
[45] Dec. 21, 1976

[54] METHOD AND SYSTEM FOR CONTROLLING ELECTRON BEAM QUANTITY IN CAMERA TUBE

[75] Inventors: Kazuhiro Sato, Tokyo; Yoshizumi Eto; Shizuka Ishibashi, both of Hachioji, all of Japan

[73] Assignees: Hitachi, Ltd.; Hitachi Electronics Co., Ltd., both of Japan

[22] Filed: May 17, 1974

[21] Appl. No.: 471,049

[30] Foreign Application Priority Data

May 21, 1973  Japan .............................. 48-55715

[52] U.S. Cl. ........................ 358/219; 178/DIG. 29
[51] Int. Cl.² ........................................ H04N 3/16
[58] Field of Search ..... 178/7.2, DIG. 28, DIG. 29, 178/DIG. 42; 358/44

[56] References Cited

UNITED STATES PATENTS

| 2,930,929 | 3/1960 | Shelton .............................. 178/7.2 |
| 3,392,236 | 7/1968 | Nielsen et al. .............. 178/DIG. 29 |
| 3,578,908 | 5/1971 | Tompkins .............................. 178/7.2 |
| 3,610,823 | 10/1971 | Haenen et al. ...................... 178/7.2 |
| 3,644,667 | 2/1972 | Shimotsuma et al. ........ 178/DIG. 8 |
| 3,715,490 | 2/1973 | Okada .................................. 178/7.2 |

Primary Examiner—John C. Martin
Attorney, Agent, or Firm—Craig & Antonelli

[57] ABSTRACT

A method and system for controlling the quantity of an electron beam in a camera tube in which scanning beam current scans a target electrode to be converted into signal current by the target electrode and this signal current is fed back in the form of a voltage signal to a beam control electrode through a feedback circuit, the amplification factor of this feedback circuit being selected to be smaller than the reciprocal of the maximum efficiency of conversion of the scanning beam current into the signal current.

4 Claims, 7 Drawing Figures

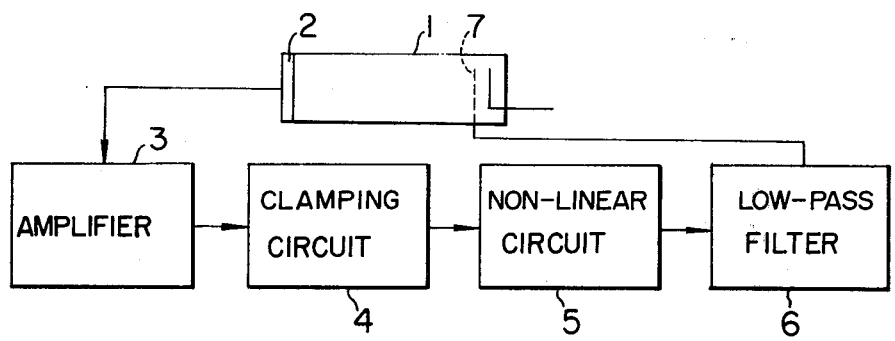
FIG. 1 PRIOR ART
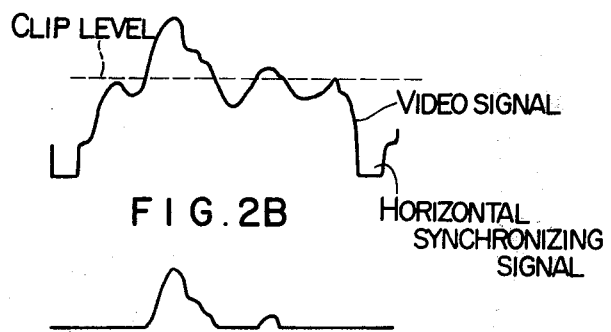
FIG. 2A PRIOR ART
FIG. 2B

METHOD AND SYSTEM FOR CONTROLLING ELECTRON BEAM QUANTITY IN CAMERA TUBE

This invention relates to a method and system for controlling the quantity of electron beam current in a camera tube so that the beam current can be supplied in proper quantity corresponding to variations in the quantity of light applied to the camera tube.

In a photoconduction type camera tube whose typical example is a vidicon or plumbicon, the quantity of an electron beam directed for scanning a target electrode is generally limited to less than a certain limit in order to ensure a high resolution. In other words, the electron beam arriving at the target electrode (photo-electric conversion surface) for scanning the target electrode tends to be focused in a poorer state with the increase in the quantity of the electron beam. Thus, in order that the signal current can be satisfactorily derived from the camera tube, the quantity of the electron beam must be limited to the minimum of the current value required for deriving the signal current. In this case, the quantity of the electron beam is generally set at a suitable value determined by taking into account the safety factor, and a severer setting is required as a higher resolution is demanded for the camera tube. However, in spite of the determination of the setting in the manner above described, existence of a highly bright portion such as light-reflecting glass or metal in an object gives rise to the defect that the charges accumulating in the portion of the photo-electric conversion surface corresponding to the bright portion of the object cannot be neutralized by one scanning with the electron beam so that shortage of the beam occurs. Further, the shortage of the beam results in the defect that a comet-tail appears with the movement of the camera.

A system as shown in FIG. 1 is known as a means for eliminating such defects. Referring to FIG. 1, signal current derived from a target electrode 2 of a camera tube 1 is amplified by an amplifier 3 and is then applied to a clamping circuit 4 which clamps the d.c. level of the signal current. Then, the bright portion (shown in FIG. 2b) of the video signal shown in FIG. 2a is extracted by a non-linear circuit 5, and after passing this video signal portion through an oscillation preventive low-pass filter 6, the signal portion is fed back to a beam current control electrode 7 in the form in which it is superposed on a d.c. voltage continuously applied to the beam current control electrode 7.

Such a feedback circuit tends to provide an oscillation phenomenon. The reason therefor has been unknown yet and various attempts including the insertion of the low-pass filter above described have heretofore been made to eliminate the undesirable oscillation. However, due to the fact that the oscillation frequency determined depending on the structure of such feedback circuit cannot be predicted and that the low-pass filter inserted in the feedback circuit may provide another source of oscillation due to, for example, the phase characteristic of the filter, the system shown in FIG. 1 is extremely unstable and difficult to be put into practical use.

The present inventors have studied to detect the real cause of oscillation in such a prior art system and found the conditions for eliminating the prior art defects. It is a primary object of the present invention to provide a novel method and system for controlling the electron beam quantity in a camera tube on the basis of the finding of the present inventors so that a picture of high quality and high resolution can be reproduced.

In the method and system according to the present invention, a camera tube is provided with a feedback circuit which applies a voltage signal corresponding to signal current to a beam current control electrode of the camera tube, and the amplification factor of the feedback circuit is selected to be smaller than the reciprocal of the maximum efficiency of conversion of scanning beam current into signal current so that beam current in proper quantity corresponding to variations in the quantity of incident light can be supplied without accompanying any oscillation of the feedback circuit.

The above and other objects, features and advantages of the present invention will become apparent from the following detailed description taken in conjunction with the accompanying drawings, in which:

FIG. 1 is a block diagram of a prior art system proposed to deal with the beam shortage;

FIG. 2a shows a waveform of a video signal;

FIG. 2b shows a waveform of a bright portion obtained by clipping the waveform shown in FIG. 2a;

Figure 3:
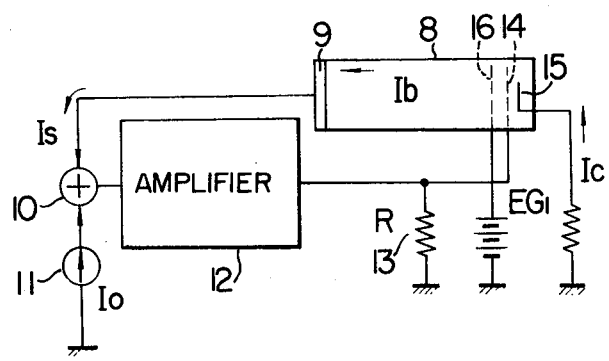
FIG. 3 is a diagram for illustrating the basic principle of the method according to the present invention.

Referring to FIG. 3 showing the basic principle of the method according to the present invention, the reference numerals 8, 9, 10, 11, 12, 13, 14, 15 and 16 designate a camera tube, a target electrode, an adder, a source of reference current, an amplifier, a resistor element, a beam current control electrode, a cathode, and an accelerating electrode respectively.

In the structure shown in FIG. 3, signal current Is is derived from the target electrode 9 of the camera tube 8 and is added by the adder 10 to reference current Io supplied from the reference current source 11. The output of the adder 10 is amplified by the amplifier 12 and is then applied to the beam current control electrode 14 after being converted into a voltage signal by the resistor element 13. The amplification factor of this feedback circuit is determined by the factors including the mutual conductance of the camera tube 8, the amplification factor of the amplifier 12, the ratio between the cathode current and the beam current, and the impedance of the resistor element 13 converting the current signal into the voltage signal.

In the structure shown in FIG. 3, the following equations (1) to (3) hold:

$$A(Io + Is) = \frac{E_{G1}}{R} \quad (1)$$

$$E_{G1} = \frac{Ic}{g_m} \quad (2)$$

$$Ic = \alpha\, Ib \quad (3)$$

where A is the amplification factor of the amplifier 12, Ib is the value of the beam current, Ic is the value of the cathode current, R is the resistance value of the resistor element 13, $E_{G1}$ is the voltage value applied to the beam current control electrode 14, $g_m$ is the mutual conductance of the camera tube 8, and $\alpha$ is the proportional constant.

From the above equations (1), (2) and (3), the following equation (4) can be obtained:

$$Ib = K(Io + Is) \qquad (4)$$

where $$K \equiv \frac{R \cdot g_m \cdot A}{\alpha}$$

Figure 4:
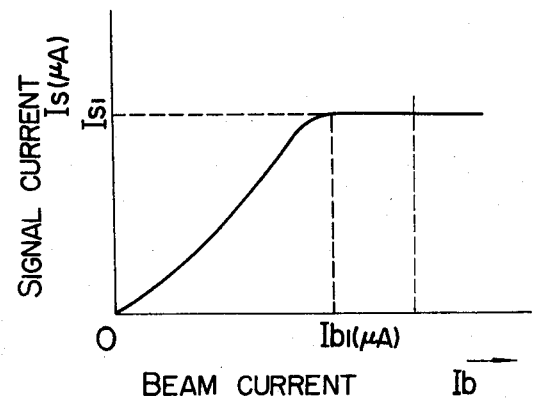
FIG. 4 is a graph showing the relation between the scanning beam current Ib and the signal current Is in FIG. 3.

Actual measurement performed by the present inventors has proved that the beam current $Ib$ and signal current $Is$ have a relation as shown in FIG. 4 when the quantity of incident light is constant. In FIG. 4, the vertical axis represents the signal current $Is$ in $\mu A$ and the horizontal axis represents the beam current $Ib$ in $\mu A$. It will be seen in FIG. 4 that the signal current $Is$ saturates at a certain point irrespective of the value of the beam current $Ib$. Therefore, suppose that $Is1$ is the value of $Is$ at which it saturates and $Ib1$ is the value of $Ib$ in such a case, then, the relation $Is = Is1$ holds within the range of $Ib \geq Ib1$. Thus, any functional relation does not exist between $Is$ and $Ib$, and the circuit shown in FIG. 3 does not oscillate due to the fact that it is an open circuit. Therefore, the circuit operates normally within the above range and a stable state is maintained while the camera tube is picking up the picture of an object.

However, when beam shortage occurs as a result of appearance of a bright portion in the object due to a change of the object or movement of the camera tube, a transient state appears in which the circuit operates to eliminate such a beam shortage. In other words, positive feedback may take place and oscillation tends to occur. More precisely, in the state in which the beam shortage occurs, the beam current $Ib$ lies within the range of $0 < Ib < Ib1$, and the relation between the signal current $Is$ and the beam current $Ib$ is expressed by the following equation (5):

$$Is = F \cdot Ib \qquad (5)$$

where F is the conversion efficiency.

Figure 5:
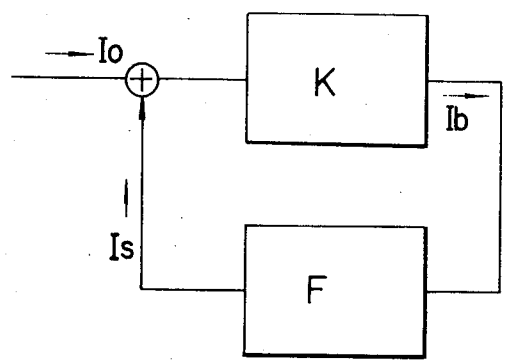
FIG. 5 shows an equivalent circuit of the circuit shown in FIG. 3.

In this case, the circuit shown in FIG. 3 is equivalent to a circuit shown in FIG. 5 and the following equation (6) is obtained from the equations (4) and (5):

$$Ib = \frac{K \cdot Io}{1 - K \cdot F} \qquad (6)$$

It will be apparent from the equation (6) that no oscillation takes place when the relation $K \cdot F < 1$ holds. It will be seen that the loop gain of the circuit, when such a positive feedback occurs, is determined by the product of the efficiency F of conversion of the beam current into the signal current and the gain K of the feedback circuit. Due to the fact that the conversion efficiency F is a constant peculiar to the camera tube, it is known that the circuit shown in FIG. 3 can operate stably without any oscillation when the circuit gain K is selected to be smaller than the reciprocal of the conversion efficiency F. As seen in FIG. 4, the conversion efficiency F is not always constant within the range of $0 < Ib < Ib1$. However, the desired relation of $K \cdot F < 1$ can be realized within the range of all the values of $Ib$ when the maximum value $Fm$ of F is selected to give the relation $K \cdot Fm < 1$.

Figure 6:
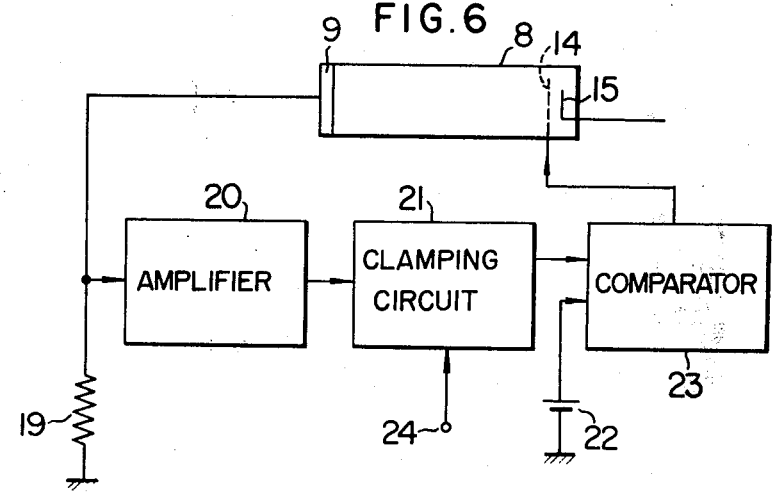
FIG. 6 is a block diagram of an embodiment of the system according to the present invention.

FIG. 6 is a block diagram of an embodiment of the system according to the present invention, and like reference numerals are used therein to denote like parts appearing in FIG. 3. Referring to FIG. 6, a camera tube 8 includes a target electrode 9, a beam current control electrode 14 and a cathode 15, and reference numerals 19, 20, 21, 22 and 23 designate a load resistor, an amplifier, a clamping circuit, a source of reference voltage, and a comparing amplifier respectively. A horizontal synchronizing signal is applied to the clamping circuit 21 through a terminal 24.

In the system having a structure as above described, signal current derived from the target electrode 9 of the camera tube 8 is converted into a voltage signal and amplified by a preamplifier composed of the load resistor 19 and amplifier 20. This voltage signal is subjected to d.c. clamping by the clamping circuit 21 to which the horizontal synchronizing signal is applied through the terminal 24. The comparing amplifier 23 compares the output of the clamping circuit 21 with a reference voltage applied from the reference voltage source 22 and amplifies the result of comparison. The output of the comparing amplifier 23 is applied to the beam current control electrode 14 of the camera tube 8. The gain K of the feedback circuit is provided by the resistance of the load resistor 19, the amplification factor of the amplifier 20, the amplification factor of the comparing amplifier 23, the mutual conductance of the camera tube 8, and the proportional constant $\alpha$ during conversion of the cathode current into the scanning beam current. Among these factors, $\alpha$ and $g_m$ vary depending on camera tubes. In the case of the camera tube employed by the present inventors in the test, $\alpha$ and $g_m$ were $0.6 \times 10^3$ and $40 \times 10^{-6} \Omega$ respectively. The maximum value $Fm$ of another factor F among the factors determining the oscillating conditions of this feedback circuit is approximately equal to unity and this value does not vary substantially depending on camera tube. Thus, when K is smaller than unity, no oscillation occurs. The present inventors designed the circuit by employing the value of K as $K = 0.9$ taking into account the safety factor and sought the product of the amplification factor A of the amplifier and the resistance R of the load resistor using the already known values of $\alpha$ and $g_m$. The product $R \cdot A$ thus obtained was $13.5 \times 10^6$ $\omega$. The result of experimental operation of the circuit designed on the basis of these values proved that the beam current could be stably controlled.

It will be understood from the foregoing detailed description of the present invention that the new concept, that is, the efficiency of conversion of beam current into signal current is introduced so as to eliminate any oscillation of feedback circuit even when the beam current is controlled by the signal current. Thus, the beam current control system according to the present invention can operate stably and the dynamic range of the camera tube can be greatly widened compared with that of the prior art system in which the beam current has been fixed. Further, undesirable deterioration of the picture quality due to beam shortage can be prevented. Furthermore, undesirable reductions of the resolution can be prevented due to the fact that the quantity of the beam can be varied depending on the brightness of an object.

We claim:

1. A method of controlling the quantity of an electron beam in a photoconduction type camera tube comprising the steps of scanning a target electrode of said camera tube with an electron beam whose quantity is controlled by a beam current control electrode of said camera tube thereby converting said electron beam into a signal current with a predetermined conversion efficiency, the signal current being derived only from the target electrode, and feeding said signal current back to said beam current control electrode in the form of a voltage signal with an amplification factor which is smaller than the reciprocal of the maximum value of said conversion efficiency at least when a shortage of beam current occurs.

2. A system for controlling the quantity of an electron beam in a photoconduction type camera tube by scanning a target electrode of said camera tube with an electron beam whose quantity is controlled by a beam current control electrode of said camera tube thereby converting said electron beam into a signal current with a predetermined conversion efficiency and deriving said signal current only from said target electrode, said system comprising a feedback circuit for applying said signal current to said beam current control electrode, said feedback circuit including first means for converting said signal current into a voltage signal and amplifying said voltage signal, second means for d.c. clamping the output of said first means, and third means for comparing the output of said second means with a predetermined voltage value, the output of said third means being applied to said beam current control electrode and the amplification factor for the output of said third means being smaller than the reciprocal of the maximum value of said conversion efficiency at least when a shortage of beam current occurs.

3. A system for controlling the quantity of electron beam in a photoconduction type camera tube wherein a target electrode is scanned with an electron beam, the quantity of which electrode beam is controlled by a beam current control electrode, exclusive of the tube cathode, to convert the electron beam current into signal current with a predetermined conversion efficiency, said signal current being derived only from said target electrode, said system comprising:

amplifier feedback means, connected to said target electrode, for converting said signal current into a prescribed voltage signal, said first amplifier means having an amplification factor which is smaller than the reciprocal of the maximum value of said predetermined conversion efficiency at least when a shortage of beam current occurs; and means, connected between said amplifier feedback means and said beam current control electrode, for supplying said prescribed voltage signal exclusively to said beam current control electrode.

4. A system according to claim 3, wherein said amplifier feedback means comprises:

a resistor connected between said target electrode and a first reference potential source, an amplifier connected to said target electrode, a clamping circuit connected to the output of said amplifier, and a comparator circuit which compares the output of said clamping circuit with a second reference potential source; and wherein the output of said comparator circuit is connected exclusively to said control electrode.

* * * * *